United States Patent [19]
Shiragaki

[11] Patent Number: 6,023,452
[45] Date of Patent: Feb. 8, 2000

[54] NETWORK FAILURE RESTORATION METHOD WITH DIFFERENT RECOVERY PERFORMANCES FOR DIFFERENT SIGNAL GROUPS

[75] Inventor: Tatsuya Shiragaki, Tokyo, Japan

[73] Assignee: NEC Corporation, Japan

[21] Appl. No.: 08/859,147

[22] Filed: May 20, 1997

[30] Foreign Application Priority Data

May 20, 1996 [JP] Japan ................................ 8-124185

[51] Int. Cl.[7] .......................... G01R 31/08; G06F 11/00; G08C 15/00
[52] U.S. Cl. .......................................................... 370/227
[58] Field of Search ................................ 370/219, 220, 370/226, 227, 228, 238, 248; 340/825.01, 827

[56] References Cited

U.S. PATENT DOCUMENTS

| | | | |
|---|---|---|---|
| 5,353,283 | 10/1994 | Tsuchiya | 370/400 |
| 5,555,477 | 9/1996 | Tomooka et al. | 359/115 |
| 5,796,717 | 7/1998 | Shinbashi et al. | 370/216 |

FOREIGN PATENT DOCUMENTS

| | | |
|---|---|---|
| 4270432 | of 1992 | Japan . |
| 5-91103 | of 1993 | Japan . |
| 5292111 | of 1993 | Japan . |
| 5316112 | of 1993 | Japan . |
| 8-18592 | of 1996 | Japan . |
| 8-8949 | of 1996 | Japan . |
| 8186559 | of 1996 | Japan . |
| 9-93279 | of 1997 | Japan . |

OTHER PUBLICATIONS

Office Action Issued by the Japanese Patent Office On Oct. 21, 1998 and an English Translation therefor.
IEEE Communications Magazine, Vo. 28, No. 6, June 1990, Tom Flanagan, "Fiber Network Survivability", pp. 46–53.
IEEE Global Telecommunications Conference. Globecom' 91 Conference Records vol. 2, Okanoue Y. et al., "Design and Control Issues of Integrated Self–Healing Networks in Sonet", pp. 22.1.1 through 22.1.6 (Dec. 2–5, 1991).
IEEE Journal on Selected Areas in Communications, vol. 12, No. 1, Jan. 1994, Hasegawa S. et al., "Control Algorithms of Sonet Integrated Self–Healing Networks", pp. 110–119.
The Institute of Electronics, Information and Communication Engineers, Technical Report of IEICE, OCS 93–30 (1993–07), Novel Optical Cross–Connect System for Hitless Optical Network Reconfiguration, pp. 9–15, Jul. 27, 1993.
IEEE Communications Magazine, vol. 34, No. 12, December 1996, Sato K. et al. "Photonic Transport Network OAM Technologies", pp. 86–94.

(List continued on next page.)

*Primary Examiner*—Michael Horabik
*Assistant Examiner*—Kevin C. Harper
*Attorney, Agent, or Firm*—Ostrolenk, Faber, Gerb & Soffen, LLP

[57] ABSTRACT

In a communications network, shared spare routes and dedicated spare routes are provided between nodes of adjacent pairs and a dedicated spare path are provided between terminal nodes. Each of the dedicated and shared spare routes comprises a link or a series of permanently connected links. A first signal requiring a quick fault restoration performance is transmitted over the first working path and a second signal not requiring the quick fault restoration performance is transmitted over the second working path. The working paths and all working links are monitored to detect a path or link failure. If the first working path is affected by a path failure, the first signal is instantly switched to the dedicated spare path, and if it is affected by a link failure, the first working path is reestablished using one of the dedicated spare routes. If the second working path is affected by a path failure, an alternate path is established between the terminal nodes using the shared spare routes and the second signal is switched to the alternate path and if it is affected by a link failure, an alternate route is established using one of the shared spare routes and the second working path is reestablished using the alternate route.

10 Claims, 2 Drawing Sheets

OTHER PUBLICATIONS

Electronics Letters, vol. 32, No. 3, LST Feb. 1996, Hamel A. et al. "Increased Capacity in an MS Protection Ring Using WDM Technique and OADM: The Coloured Section Ring". IEEE Global Telecommunications Conference. Globecom' 94 Conference Records vol. 3, Chung R.S.K. et al.: "A Multilayer Restoration Strategy for Reconfigurable Networks", pp. 1872–1878. No month.

IEEE Journal of Lightwave Technology, vol. 11, No. 5, May/June 1993, Johansson S. et al. "Optical Cross–Connect System in Broad–Band Networks: System Concept and Demonstrators Description", pp. 688–694.

The Institute of Electronics, Information and Communication Engineers, Mar. 24–27, 1997, Kansai University, Suita, Proceedings of the 1997 IEICE General Conference.

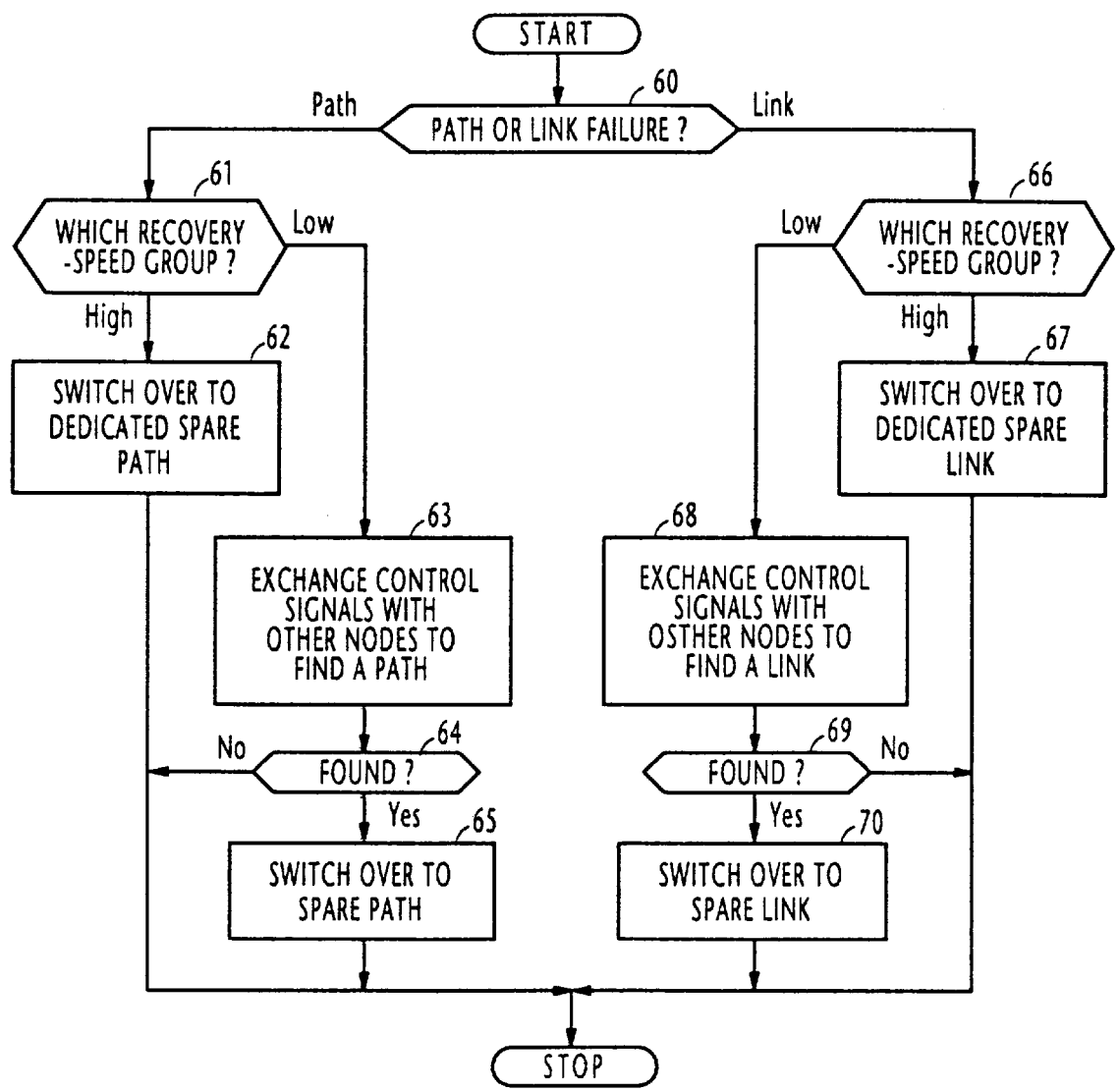

NETWORK FAILURE RESTORATION METHOD WITH DIFFERENT RECOVERY PERFORMANCES FOR DIFFERENT SIGNAL GROUPS

BACKGROUND OF THE INVENTION

1. Field of the Invention

The present invention relates generally to a communications network, and more specifically to the restoration of network resource from network failure.

2. Description of the Related Art

In a communications network, it is the usual practice to multiplex signals for a particular destination into a single multiplex signal and transmit it over a physical or virtual path that is established between two terminal (i.e., end) nodes. The traffic carried by the path may include data signals for inter-bank transactions that require a high recovery speed with which they are protection-switched to a spare path, and others that do not require such high speed recovery performance and allow a delay of as long as a few seconds. Since the fault recovery speed of a network path is usually matched to the high speed restoration requirement of the signals it carries and high-speed restoration performance requires an extra cost or investment, it is not economically advantageous to multiplex low-speed requirement signals with high-speed requirement signals onto a network path to allow the former to share high cost restoration facilities with the latter.

SUMMARY OF THE INVENTION

It is therefore an object of the present invention to achieve economical provisioning of network resources by providing fault recovery performance at different levels corresponding to signals of different fault recovery speeds.

According to a broader aspect of the present invention, there is provided a fault recovery method for a communication network wherein a plurality of nodes are interconnected by working links and terminal nodes are interconnected by first and second working paths each being formed with a series of working links. The method comprises providing, between the terminal nodes, a dedicated spare path and providing, between pairs of adjacent nodes, a plurality of shared spare routes each comprising at least one spare link. First and second signals are transmitted over the first and second working paths respectively, the first signal requiring the quick fault restoration performance and the second signal not requiring the quick fault restoration performance. The first and second working paths are monitored to detect a path failure. If the first working path is affected by a path failure, the first signal is switched to the dedicated spare path, and if the second working path is affected by a path failure, an alternate path is established between the terminal nodes using the shared spare routes and the second signal is switched to the alternate path.

According to a narrower aspect, the present invention provides, between the terminal nodes, a dedicated spare path, and provides, between pairs of adjacent nodes, a plurality of dedicated spare routes and a plurality of shared spare routes, each of the dedicated and shared spare routes comprising at least one spare link. A first signal requiring a quick fault restoration performance is transmitted over the first working path and a second signal not requiring the quick fault restoration performance is transmitted over the second working path. The working paths and links are monitored to detect a path failure and a link failure. If the first working path is affected by a path failure, the first signal is switched to the dedicated spare path, and if the first working path is affected by a link failure, the first working path is reestablished using one of the dedicated spare routes. If the second working path is affected by a path failure, an alternate path is established between the terminal nodes using the shared spare routes and the second signal is switched to the alternate path, and if the second working path is affected by a link failure, an alternate route is established between adjacent nodes using one of the shared spare routes and the second working path is reestablished using the alternate route.

According to another aspect, the present invention provides a communications network comprising a pair of terminal nodes and an intermediate node interconnected by links, first and second working paths between the terminal nodes via the intermediate node, each of the working paths comprising a series of working links, the first working path transmitting a first signal which requires a quick restoration performance and the second working path transmitting a second signal which does not require the quick restoration performance. The network includes, between the terminal nodes, a dedicated spare path, and a plurality of shared spare links. Each network node monitors the working paths to detect a path failure, switches the first signal to the dedicated spare path if a path failure is detected in the first working path, and established an alternate path between the terminal nodes using the shared spare links and switches the second signal to the alternate path if a path failure is detected in the second working path.

According to a further aspect, the present invention provides a communications network comprising a pair of terminal nodes and an intermediate node interconnected by links, first and second working paths established between the terminal nodes via the intermediate node, each of the working paths comprising a series of working links, the first working path transmitting a first signal which requires a quick restoration performance and the second working path transmitting a second signal which does not require the quick restoration performance. The network includes a dedicated spare path between the terminal nodes, a plurality of dedicated spare routes between the terminal nodes, and a plurality of shared spare routes between the terminal nodes. Each network node monitors the working paths to detect a path failure and a link failure. If the first working path is affected by a path failure, the first signal is switched to the dedicated spare path, and if the first working path is affected by a link failure, the first working path is reestablished using one of the dedicated spare routes. If the second working path is affected by a path failure, an alternate path is established between the terminal nodes using the shared spare routes and the second signal is switched to the alternate path and if the second working path is affected by a link failure, an alternate route is established between adjacent nodes using one of the shared spare routes and the second working path is reestablished using the alternate route.

Each network node preferably comprises an optical cross-connect system for switching a wavelength-time-division multiplex signal at different levels of digital hierarchy.

BRIEF DESCRIPTION OF THE DRAWINGS

The present invention will be described in further detail with reference to the accompanying drawings, in which:

FIG. 2 is a flowchart of the operation of each node of the network.

DETAILED DESCRIPTION

Figure 1:
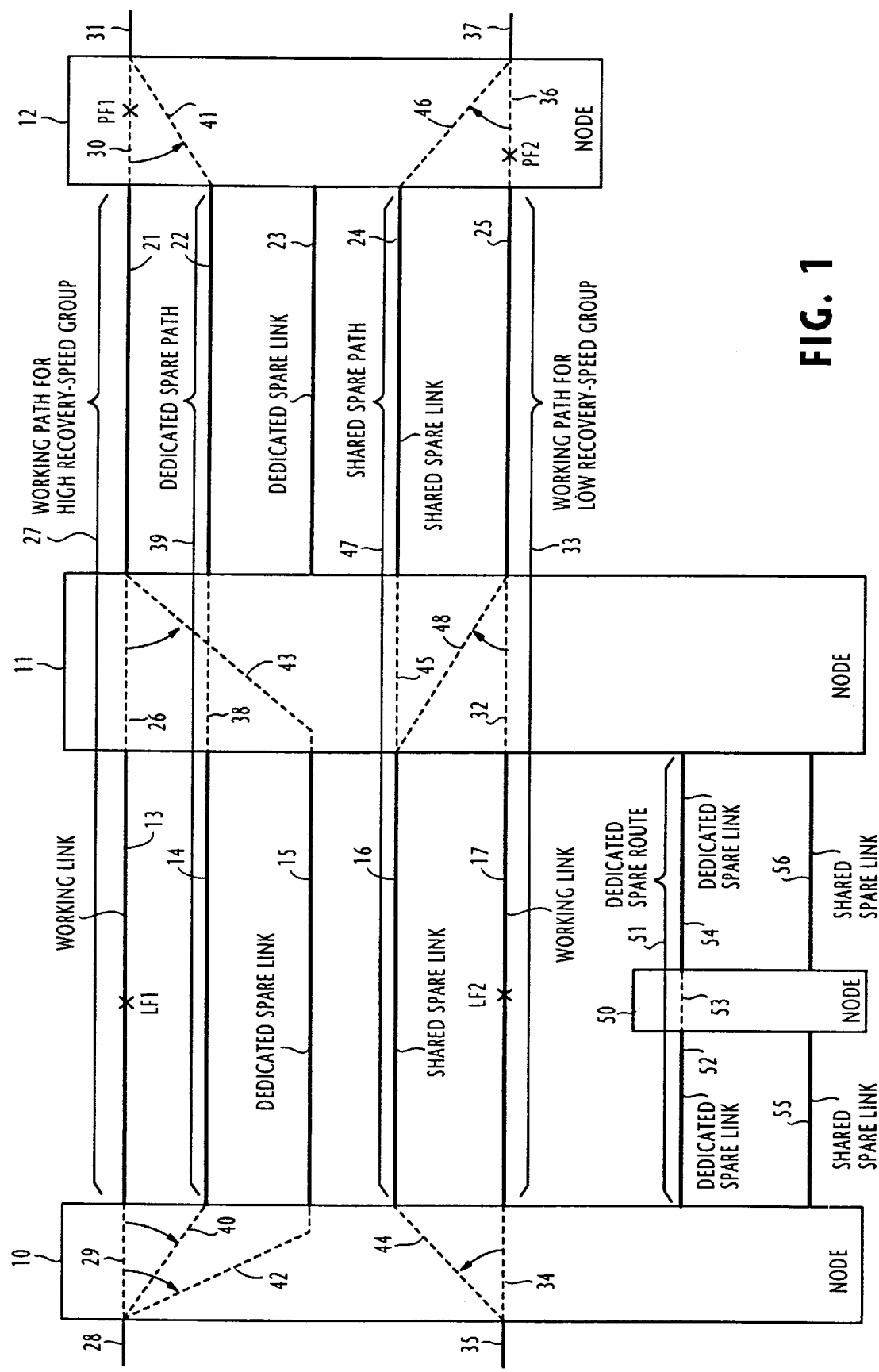
FIG. 1 is a block diagram of an exemplary communications network for describing the present invention.

In FIG. 1, an exemplary communications network is shown as comprising nodes 10, 11 and 12 interconnected by optical fibers, or links. As illustrated, nodes 10 and 12 are terminal (end) nodes where logical communication channels, or "paths" are established over concatenated links connected by intermediate (transit) node 11. Each path supports a particular optical bandwidth of a wavelength-time-division multiplex (WTDM) signal.

Each network node includes an optical cross-connect system for switching the WTDM signal at different levels of digital hierarchy. A suitable cross-connect system for implementing the present invention is disclosed in U.S. Pat. No. 5,457,556 issued to Tatsuya Shiragaki. At each node, a WTDM signal may be demultiplexed into a plurality of optical TDM signals of particular wavelength or lower hierarchical level digital signals may be multiplexed into an optical TDM signal of particular wavelength. A path carrying such a single-wavelength signal between terminal nodes is a "wavelength path" and an intermediate node that supports a wavelength path provides no wavelength conversion and is termed a WP cross-connect node. If wavelength conversion is provided in an intermediate node, the node is a VWP cross-connect node, and the path passing through this node carries signals of different wavelength and is termed a "virtual wavelength path".

Nodes 10 and 11 are interconnected by links 13 to 17 and nodes 11 and 12 are interconnected by links 21 to 25.

Under normal conditions, a connection 26 is established in node 11 between links 13 and 21 to form a first working path 27 between terminal nodes 10 and 12. One end of the path 27 is connected to a local access line 28 via a connection 29 at node 10 and the other end of the path 27 is connected through a connection 30 to a local access line 31. In addition, a connection 32 is established in node 11 between links 17 and 25 to form a second working path 33 between terminal nodes 10 and 12.

According to the present invention, traffic signals are classified into a high recovery-speed group and a low recovery-speed group according to their different tolerances to down time. Inter-bank data signals are one of the examples that are relatively intolerant of outage and require high speed restoration from failure. There are other signals that are relatively tolerant of down time and allow some delays. Such signals do not necessarily require high speed restoration performance. The signals that require quick recovery from failure are classified under the high recovery-speed group and carried by the working path 27, while the signals that do not necessarily require quick recovery are classified under the low recovery-speed group and carried by the working path 33.

Spare facilities are provided in the network for protection-switching a failed working path or link. For this purpose, a connection 38 is permanently established in node 11 between links 14 and 22 to form a spare path 39 between terminal nodes 10 and 12. The spare path 39 is used as a dedicated spare path for the working path 27 if the latter should encounter a path failure. In addition, links 15 and 23 are reserved as dedicated spare links to be used for the working path 27 if the latter should encounter a link failure. On the other hand, links 16 and 24 are reserved as "shared" spare links for the working path 33 if the latter should encounter either a path failure or a link failure.

The network may further include an intermediate node 50 between nodes 10 and 11 to establish a dedicated spare route 51 consisting of a series spare links 52 and 54 permanently connected by a connection 53 at node 50. In addition, a shared spare link 55 may be provided between nodes 10 and 50 and a shared spare link 56 between nodes 50 and 11.

As described in the aforesaid Shiragaki U.S. patent, the cross-connect system at each network node is provided with fault detection and rerouting circuitry that monitors traffic signals, exchange control signals with other network nodes when the monitored signals indicate the presence of either a path failure or a link failure, and automatically reestablish switched connections to reroute the traffic signals to appropriate spare facilities.

As illustrated in the flowchart of FIG. 2, the operation of the fault detection and rerouting circuitry of each network node starts with step 60 where all traffic signals are monitored for the presence of a path failure or a link failure.

If a path failure is detected, flow proceeds from step 60 to step 61 to identify the recovery-speed group of the failed path. If the failed path is one that carries the signal of high recovery-speed group, flow proceeds from step 61 to step 62 to switch the affected signal from the failed path to the dedicated spare path that is associated with the failed working path. If the failed path is identified as one carrying the signal of low recovery-speed group, flow proceeds from step 61 to step 63 to exchange control signals with other nodes to find an alternate path. If such an alternate path is found (step 64), flow proceeds from step 64 to step 65 to switch the affected signal from the failed working path to the alternate path.

If a failure is detected in a link, flow proceeds from step 60 to step 66 to identify the recovery-speed group of the failed link. If the failed link is one that carries the signal of high recovery-speed group, flow proceeds from step 66 to step 67 to switch the affected signal from the failed link to the dedicated spare link that is associated with the failed working link. If the failed link is identified as one carrying the signal of low recovery-speed group, flow proceeds from step 66 to step 68 to exchange control signals with other nodes to find an alternate link. If such an alternate link is found (step 69), flow proceeds from step 69 to step 60 to switch the affected signal from the failed working link to the alternate link.

The operation of this invention will best be understood by the following description with reference to FIG. 1.

If a path failure PF1 occurs in the working path 27, nodes 10 and 12 establish connections 40 and 41, respectively, in their cross-connect systems for connecting the dedicated spare path 39 between lines 28 and 31 and clear the connections 29 and 30. Since the dedicated spare path 39 is in readiness to carry signals therethorugh by virtue of the preestablished connection 38, the path for down-time intolerant signals can be restored in a short period of time.

If a link failure LF1 occurs in the link 13, the link 13 fails and nodes 10 and 11 establish connections 42 and 43, respectively, for connecting the dedicated spare link 15 between line 28 and link 21 and clear the connections 29 and 26, thus instantly switching the failed down-time intolerant signals to an alternate path.

If a path failure PF2 occurs in the working path 33, nodes 10, 11 and 12 exchange control signals to find links 16 and 24 as appropriate path segments and establish connections 44, 45 and 46, respectively, to form an alternate path 47 between local access lines 35 and 37 and clear the connections 34, 32 and 36. Such an alternate path is a shared spare path which is created on an as-needed basis, path than on a preassigned basis, and the links that comprise it are shared among a plurality of working paths that carry signals of the low recovery-speed group. Since the establishment of the shared spare path takes time, the as-needed approach for path recovery is economically advantageous for down-time tolerant signals.

If a link failure LF2 occurs in the link 17, nodes 10 and 11 exchange control signals to find the link 16 as an alternate link and establish connections 44 and 48, respectively, for connecting the spare link 16 between access line 35 and link 25 and clear the connections 34 and 32. Such an alternate link is created on an as-needed basis and can be shared among working links that carry signals of the low recovery-speed group. Since the establishment of such a shared spare link takes time, the as-needed approach for link recovery is economically advantageous for down-time tolerant signals.

It is seen that the dedicated spare rout 51 can also be used instead of the dedicated spare link 15 in the event of link failure LF1, and shared spare links 55 and 56 can also be used instead of the shared spare link 16 in the event of link failure LF2. In the latter case, nodes 10, 50 and 11 exchange controls signals to establish a connection at node 50 between links 55 and 56.

What is claimed is:

1. A fault recovery method for a communication network wherein a plurality of nodes are interconnected by working links and terminal nodes are interconnected by first and second working paths each being formed with a series of working links, the fault recovery method comprising the steps of:
   a) providing, between said terminal nodes, a dedicated spare path comprising a permanently connected series of spare links and providing, between adjacent nodes, a plurality of shared spare routes each comprising at least one spare link;
   b) transmitting first and second signals over said first and second working path respectively, said first signal requiring a quick fault restoration performance and said second signal not requiring said quick fault restoration performance;
   c) monitoring said working paths to detect a path failure; and
   d) switching said first signal to said dedicated spare path if said first working path is affected by a path failure, and establishing an alternate path between said terminal nodes using said shared spare routes and switching said second signal to said alternate path if said second working path is affected by a path failure.

2. The fault recovery method as claimed in claim 1, wherein each of said shared spare routes is formed by a series of spare links connected by an intermediate node.

3. A fault recovery method for a communication network wherein a plurality of nodes are interconnected by working links and terminal nodes are interconnected by first and second working paths each being formed with a series of working links, the fault recovery method comprising the steps of:
   a) providing between said terminal nodes a dedicated spare path comprising a permanently connected series of spare links, and providing between adjacent nodes a plurality of dedicated spare routes and a plurality of shared spare routes, each of said dedicated and shared spare routes comprising at least one spare link;
   b) transmitting first and second signals over said first and second working paths respectively, said first signal requiring a quick fault restoration performance and said second signal not requiring said quick fault restoration performance;
   c) monitoring said working paths and links to detect a path failure and a link failure; and
   d) if said first working path is affected by a path failure, switching said first signal to said dedicated spare path, if said first working path is affected by a link failure, reestablishing said first working path via one of said dedicated spare routes, if said second working path is affected by a path failure, establishing an alternate path between said terminal nodes using said shared spare routes and switching said second signal to the alternate path, and if said second working path is affected by a link failure, establishing an alternate route between adjacent nodes using one of said shared spare routes and reestablishing the second working path via said alternate route.

4. The fault recovery method as claimed in claim 3, wherein each said dedicated spare routes comprises a series of permanently connected spare links and each of said shared spare routes comprises a series of mutually disconnected spare links.

5. A communications network comprising:
   a pair of terminal nodes and an intermediate node interconnected by links;
   first and second working paths between said terminal nodes via said intermediate node, each of said working paths comprising a series of working links, said first working path transmitting a first signal which requires a quick fault restoration performance and said second working path transmitting a second signal which does not require said fault quick restoration performance;
   a dedicated spare path between said terminal nodes, said dedicated spare path comprising a permanently connected series of spare links; and
   a plurality of shared spare routes between nodes of adjacent pairs, each of said shared spare routes comprising at least one spare link;
   each of said nodes monitoring said working paths to detect a path failure, switching said first signal to said dedicated spare path if the first working path is affected by a path failure, and establishing an alternate path between said terminal nodes using said shared spare routes and switching said second signal to said alternate path if said second working path is affected by a path failure.

6. The communications network as claimed in claim 5, wherein each of said shared spare routes is formed by a series of spare links connected by an intermediate node.

7. The communications network as claimed in claim 5, wherein each of said nodes comprises an optical cross-connect system for switching a wavelength-time-division multiplex signal at different levels of digital hierarchy according to said path failure.

8. A communications network comprising
   a pair of terminal nodes and an intermediate node interconnected by links,
   first and second working paths between said terminal nodes via said intermediate node, each of said working paths comprising a series of working links, said first working path transmitting a first signal which requires a quick fault restoration performance and said second working path transmitting a second signal which does not require said quick fault restoration performance;
   a dedicated spare path between said terminal nodes, said dedicated spare path comprising a permanently connected series of spare links;
   a plurality of dedicated spare links between adjacent nodes;

a plurality of shared spare routes between said adjacent nodes, each of said shared spare routes comprising at least one spare link;

each of said nodes monitoring said working paths to detect a path failure and a link failure, switching said first signal to said dedicated spare path if said first working path is affected by a path failure, reestablishing said first working path using one of said dedicated spare routes if said first working path is affected by a link failure, establishing an alternate path between said terminal nodes using said shared spare routes and switching said second signal to said alternate path if said second working path is affected by a path failure, and establishing an alternate route between adjacent nodes using one of said shared spare tours and reestablishing said second working path using the alternate route.

9. The communication network as claimed in claim 8, wherein each of said dedicated spare routes comprises a series of permanently connected spare links and each of said shared spare routes comprises a series of mutually disconnected spare links.

10. The communications network as claimed in claim 8, wherein each of said nodes comprises an optical cross-connect system for switching a wavelength-time-division multiplex signal at different levels of digital hierarchy according to said path and link failures.

* * * * *